(12) United States Patent
Yuan (10) Patent No.: US 7,649,965 B2
(45) Date of Patent: Jan. 19, 2010

(54) MAXIMUM LIKELIHOOD CHANNEL ESTIMATOR

(75) Inventor: Warm Shaw Yuan, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 630 days.

(21) Appl. No.: 11/521,854

(22) Filed: Sep. 15, 2006

(65) Prior Publication Data

US 2008/0123782 A1    May 29, 2008

(51) Int. Cl.
*H04L 27/06* (2006.01)
*H03M 13/00* (2006.01)
*H03M 13/03* (2006.01)

(52) U.S. Cl. .................. 375/341; 714/759; 714/794

(58) Field of Classification Search .......... 375/262, 375/316, 340, 341, 285, 346, 348; 714/763, 714/764, 766, 768, 769, 786, 794
See application file for complete search history.

(56) References Cited

U.S. PATENT DOCUMENTS 6,763,494 B2 * 7/2004 Hewitt .................. 714/780
2005/0154955 A1 * 7/2005 Cai et al. .................. 714/746
2009/0161782 A1 * 6/2009 Kolze et al. .................. 375/260

* cited by examiner

*Primary Examiner*—Tesfaldet Bocure
(74) *Attorney, Agent, or Firm*—Law Office of Gerald Maliszewski; Gerald Maliszewski (57) ABSTRACT

A system and method are provided for maximum likelihood estimation in a channel receiving data with inter-symbol interference (ISI). The method receives a serial stream of digital information bits. Decisions are made concerning the received information bit values, which the method accepts as processed information, with soft decisions (SDs) and corresponding initial hard decisions (HDs). The method then identifies a sequence of processed information in a correction matrix, and uses the correction matrix to cross-reference the sequence to a HD look-up value. In response to accessing the HD look-up value, a modified HD is created. The modified HD is decoded, for example, by using forward error correction (FEC), creating a decoded HD. The method compares the decoded HD to the initial HD, and updates the correction matrix HD look-up value in response to the comparison.

18 Claims, 7 Drawing Sheets

| FUTURE (t+1) | PRESENT (t) | PAST (t-1) |
|---|---|---|
| HD1 | HD2 | HD3 |
| SD1 | SD2 | SD3 |

Fig. 4D

|  |  | HD3' |
|---|---|---|
| HD1 | HD2 | HD3 |
| SD1 | SD2 | SD3 |

CORRECTION MATRIX ⟵ 308

| SEQUENCE | LOOK-UP VALUE |
|---|---|
| S1 | → HD1' |
| S2 | → HD2' |
| ⋮ | ⋮ |
| Sn | → HDn' |

TABLE 1
TABLE LOOK-UP

| SD_past,HD_MOD_past, SD_present,SD_future,HD_INIT_future | NUMBER OF CORRECT | NUMBER OF INCORRECT |
|---|---|---|
| 00, 0, 00, 00, 0 | 100 | 5 |
| 00, 0, 00, 00, 1 | 33 | 56 |
| ⋮ | ⋮ | ⋮ |
| 01, 1, 00, 11, 1 | 1144 | 33 |
| 01, 1, 01, 00, 0 | 1214 | 1555 |
| ⋮ | ⋮ | ⋮ |
| 11, 1, 11, 11, 1 | 1 | 0 |

TABLE LOOKUP IS USED TO DECIDE WHETHER HD_INIT_present
(INITIAL HD FOR THE PRESENT SD)
SHOULD BE INVERTED BASED ON THE NUMBER OF CORRECT AND INCORRECT DECISIONS.
IF THE NUMBER OF INCORRECT IS GREATER THAN INCORRECT THEN
HD_MOD_present = invert HD_INIT_present
else
HD_MOD_present = HD_INIT_present

Fig. 7B

TABLE 2
TABLE CONSTRUCTION

| SD_past,HD_DEC_past, SD_present,SD_future,HD_INIT_future | HD_INIT_present = HD_DEC_present | HD_INIT_present! = HD_DEC_present |
|---|---|---|
| 00, 0, 00, 00, 0 | 100 | 5 |
| 00, 0, 00, 00, 1 | 33 | 56 |
| ⋮ | ⋮ | ⋮ |
| 01, 1, 00, 11, 1 | 1144 | 33 |
| 01, 1, 01, 00, 0 | 1214 | 1555 |
| ⋮ | ⋮ | ⋮ |
| 11, 1, 11, 11, 1 | 1 | 0 |

Fig. 8

MAXIMUM LIKELIHOOD CHANNEL ESTIMATOR

BACKGROUND OF THE INVENTION

1. Field of the Invention

This invention generally relates to digital communications and, more particularly, to a system and method for minimizing the effects of inter-symbol interference in a data channel of binary coded information, in real-time, using a constantly updated history of corrected bit decisions.

2. Description of the Related Art

Figure 1:
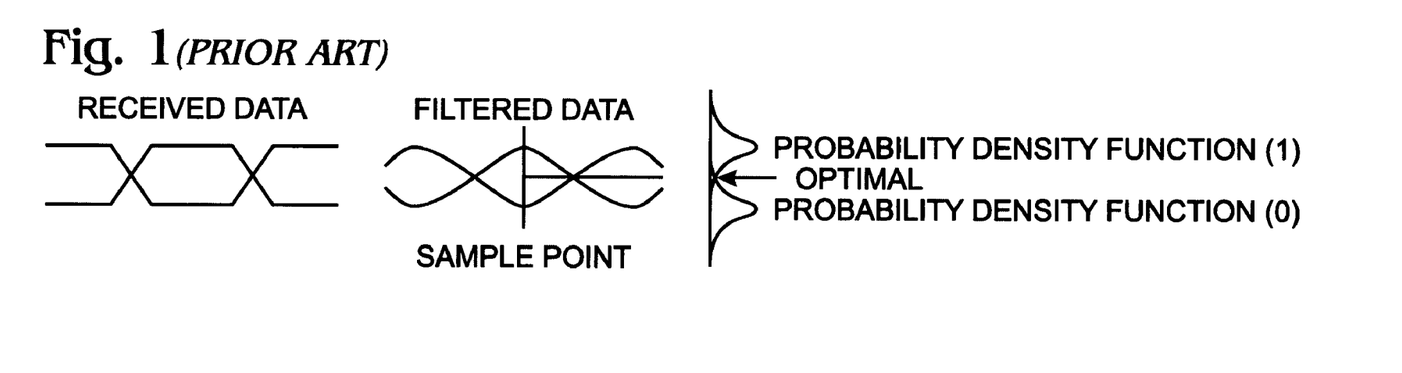
FIG. 1 is a diagram illustrating a signal recovered from a binary symmetric, non-dispersive channel in the presence of noise (prior art).

FIG. 1 is a diagram illustrating a signal recovered from a binary symmetric, non-dispersive channel in the presence of noise (prior art). Conventionally, the signal is filtered with a transfer function matched to the signaling waveform and thresholded at the voltage level most likely to yield the transmitted bit. To recover the transmitted information, a hard decision must be made on the value of the received bit.

As a function of the filtering process, and sometimes as a result of the transmission process, pulse spreading occurs. That is, the energy associated with a bit spreads to neighboring bits. For small degrees of spreading these effects can be limited to the nearest neighbors with modest degradation in performance.

Three basic types of pulse spreading exist. The first possibility is that both the neighboring bits are a zero (no neighboring bits are a one). The second possibility is that only one of the neighboring bits (either the preceding or subsequent bit) is a one. Alternately stated, only one of the neighboring bits is a zero. The third possibility is that both neighboring bits are one. For each of these cases the likelihood of error in determining a bit value can be minimized if different thresholds are used for different bit combinations.

Figure 2:
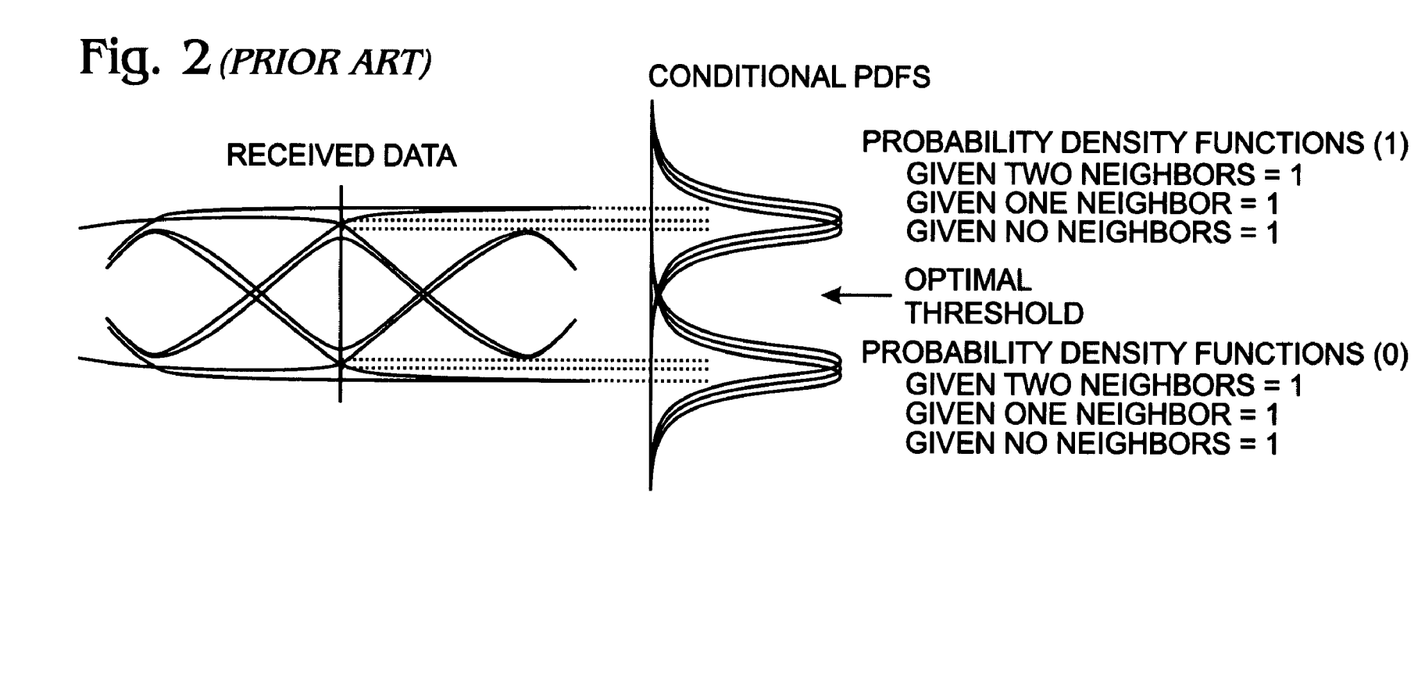
FIG. 2 is a diagram illustrating received analog waveforms that are part of a serial data stream of digitally encoded data, where the waveforms are distorted in response to the inter-symbol interference resulting from energy dispersion (prior art).

FIG. 2 is a diagram illustrating received analog waveforms that are part of a serial data stream of digitally encoded data, where the waveforms are distorted in response to the inter-symbol interference resulting from energy dispersion (prior art). The value at the output of the filter varies with each bit, and is essentially a random process, due to the non-deterministic nature of the information, and scrambling that is often used in the transmission of data streams. However, received bits can be characterized with probability density functions (PDFs), as shown. Without knowledge of the neighboring bits, a single probability density function could be extracted that represents the random behavior of the input over all conditions and all sequences. However, conditional probability density functions can be defined for the three cases mentioned above. Namely, probability density functions can be defined for the cases where there are zero neighboring ones, only one neighboring one, and two neighboring ones.

If the bit value decision process could be made using the knowledge of the decision made on the preceding decoded bit, and with a measurement of a subsequent decoded bit, then the corresponding probability density function could be selected to make a more accurate decision on the current bit decision. However, the cost and accuracy of conventional analog-to-digital (A/D) conversion circuits make such a solution impractical.

The degree of dispersion exhibited by a channel, and hence the separation of the conditional probability density functions, varies in response to a number of fixed and variable factors. Effective dispersion mitigation techniques must therefore be easily optimized to the channel and somewhat adaptive to changes in the channel due to aging, temperature changes, reconfiguration, and other possible influences.

There are numerous algorithms and techniques to find the optimum sampling time in a digital communication system. Peak detection with match-filter and early-late gate sampling are two techniques used widely for capturing sampling times. A general early-late gating scheme requires zero-crossing in the waveform. Peak detection match-filter approach is optimum when the channel and the transmitter characteristics are well known. However, early-late gating is difficult to apply if the zero-crossing is unknown. Further, peak detection is not effective without prior knowledge of the transmitter and/or channel characteristics.

It would be advantageous if inter-symbol interference caused by energy dispersion in a received data channel could be minimized.

It would be advantageous if a non-causal channel analysis could be used to minimize the effects of inter-symbol interference, in real-time, based on an analysis history of corrected bit decisions.

SUMMARY OF THE INVENTION

Accordingly, a method is provided for maximum likelihood estimation in a channel receiving data with inter-symbol interference (ISI). The method receives a serial stream of digital information bits. Decisions are made concerning the received information bit values, which the method accepts as processed information, with soft decisions (SDs) and corresponding initial hard decisions (HDs). The method then identifies a sequence of processed information in a correction matrix, and uses the correction matrix to cross-reference the sequence to a HD look-up value. In response to accessing the HD look-up value, a modified HD is created. The modified HD is decoded, for example, by using forward error correction (FEC), creating a decoded HD. The method compares the decoded HD to the initial HD, and updates the correction matrix HD look-up value in response to the comparison.

In one aspect, the method accepts and identifies a temporal sequence in the correction matrix that includes a current SD and initial HD, a past SD and initial HD, and a future SD and initial HD. Then, an HD look-up value is used to modify the current initial HD.

The decoded HD is either a corrected or uncorrected HD, as referenced to the initial HD. Then, comparing the decoded HD to the initial HD includes recording the number of corrected initial HDs, and the HD look-up value is updated in response to the number of corrected initial HDs. That is, a HD look-up value is used that minimizes the number of corrected initial HDs.

Additional details of the above-described method, and a system for maximum likelihood estimation in a channel receiving data with ISI, are provided below.

DETAILED DESCRIPTION

Figures 3, 4A:
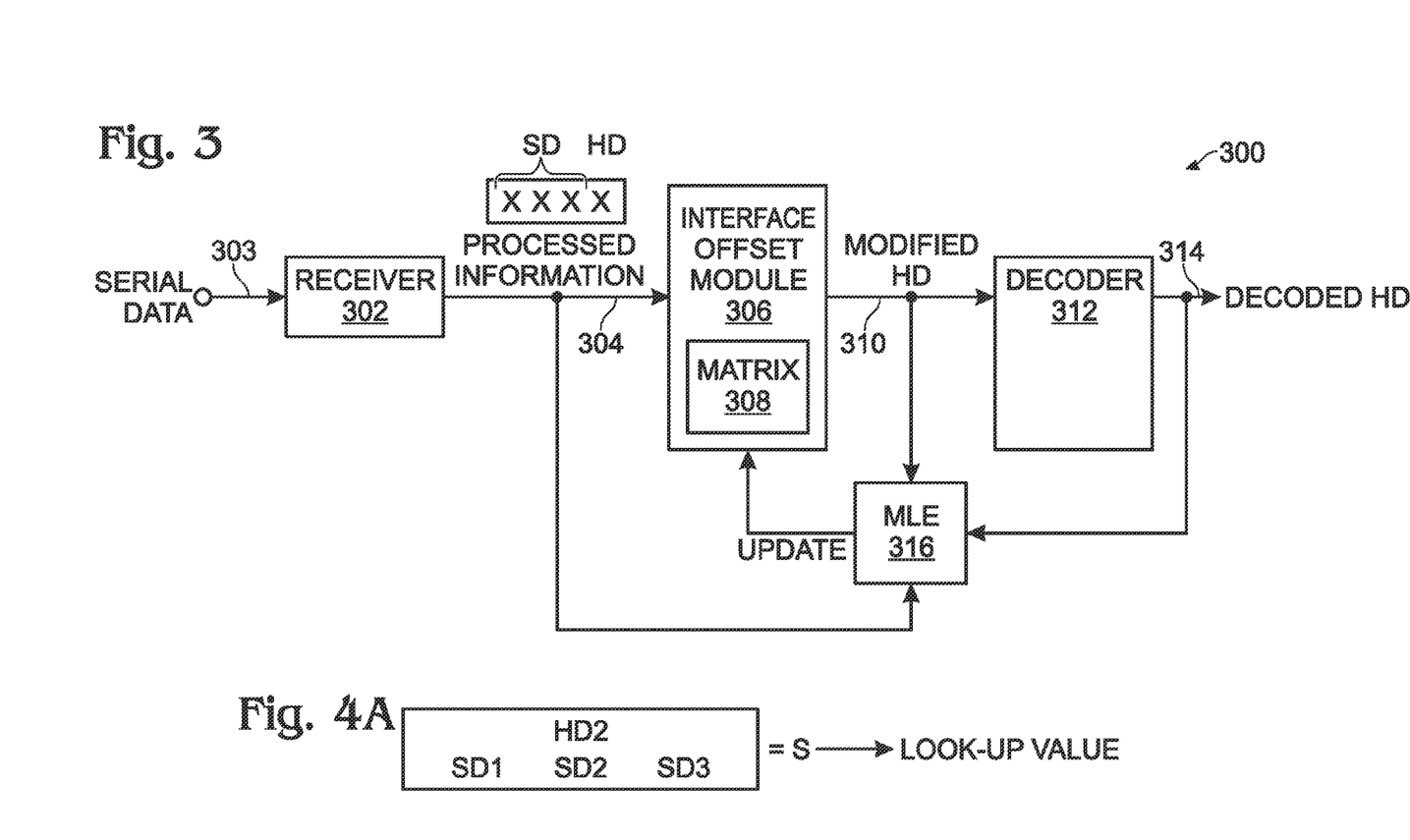
FIG. 3 is a schematic block diagram of a system for maximum likelihood estimation in a channel receiving data with inter-symbol interference (ISI).
FIGS. 4A through 4E are diagrams depicting some examples of processed information sequences.

FIG. 3 is a schematic block diagram of a system for maximum likelihood estimation in a channel receiving data with inter-symbol interference (ISI). The system 300 comprises a receiver 302 having an interface on line 303 to accept a serial stream of digital information bits, and an interface on line 304 to supply processed information with soft decisions (SDs) and corresponding initial hard decisions (HDs). As is well known in the art, a soft decision is a preliminary estimate of the hard decision. Typically, the SD decision resolution (number of bits) is higher than the HD. Alternately, the SD is binary, but accompanied with a confidence factor. As shown, the SD is 3 bits and the HD is one bit. More conventionally, the processed information on line 304 may be a byte, with a 7-bit SD and a 1-bit HD.

An interference offset module (IOM) 306 has an interface on line 304 for accepting the processed information. The IOM locates a sequence of processed information, identifies the sequence in a correction matrix 308, and cross-references the sequence to a HD look-up value. The IOM 306 creates a modified HD in response to the HD look-up value, which is supplied at an output on line 310.

A decoder 312 has an interface connected to the interference offset module output on line 310 to decode the modified HD and supply a decoded HD at an interface on line 314. In one aspect, the receiver 302 accepts a serial stream of digital information bits with forward error correction (FEC), and the decoder 312 is an FEC decoder. Alternately, decoding is performed upon a stream of predetermined information bit values. In another aspect, the correct bit values are received via a secondary channel (not shown).

A maximum likelihood estimator (MLE) 316 has an interface on line 304 to accept the sequence of processed information, an interface on line 310 to accept the modified HD, and an interface on line 314 to accept the decoded HD. The MLE 316 compares the decoded HD to the initial HD, and supplies updates to the HD look-up value in the correction matrix 308, responsive to the comparison. Alternately expressed, the decoder may change the value of modified HD's, and an analysis of the modified HD changes may be used to determine the corrections ultimately made to the initial HD, in response to the operations of both the IOM 306 and correction mode 312. Note, that an initial HD is not necessarily corrected if the decoder changes the value of the modified HD. For example, the initial HD may be corrected by the IOM, and that modified value left unchanged by the decoder.

Figure 4B:
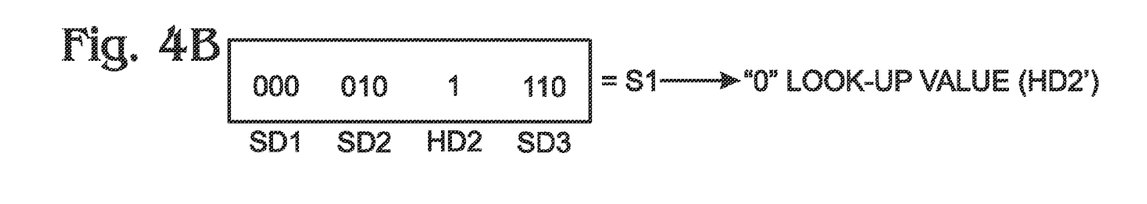

FIGS. 4A through 4E are diagrams depicting some examples of processed information sequences. The processed information sequence may be defined in a number of ways. In a very simple aspect, the "sequence" is just the initial HD, just the SD associated with the initial HD, or the combination of the initial HD and its associated SD. However, the present invention system can be made more powerful if more complex sequences are used. For example, the interference offset module may cross-reference the HD look-up value to a sequence of SDs and corresponding initial HDs. As shown in FIG. 4A, a sequence (S) includes SD1, SD2, HD2 (the HD associated with SD2), and SD3. Note, the sequence is not limited to any particular number of SDs or HDs, or any particular relationship between SD/HD pairs. In FIG. 4B, the SD and HD designators have been converted to exemplary bit values. Note, this example assumes that each SD has a 3-bit resolution. However, the invention is not limited to any particular resolution.

In another example (FIG. 4C), the sequence may include the HD associated with each SD. Thus, the sequence includes SD1, HD1, SD2, HD2, SD3, and HD3. In one aspect, the sequence may be a temporal sequence including a current SD and current initial HD (SD2/HD2), a past SD and past initial HD (SD3/HD3), and a future SD and future initial HD (SD1/HD1). The interference offset module identifies a sequence from the correction matrix with exactly the same bit values. This particular sequence (S1) is associated with an HD look-up value. For example, the IOM modifies the current initial HD (HD2) from "1", in response to the HD look-up value HD2'="0".

Figure 4C:
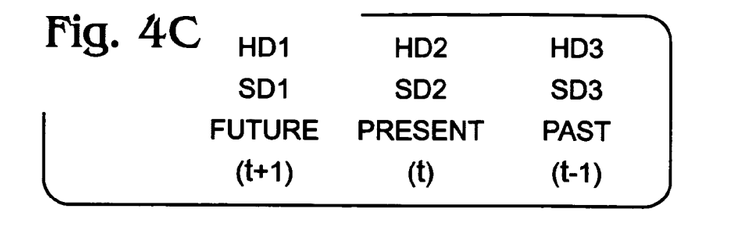

Note, a temporal sequence need not be limited to just three "times" (clock cycles). Neither must consecutive bit values be analyzed. The current SD/HD need not be symmetrically located between past and future SDs/HDs, and the modification need not necessarily be preformed on a current initial HD.

Figure 4D:
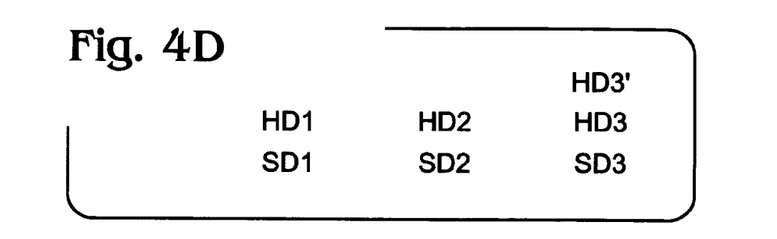

FIG. 4D depicts a sequence of SDs and corresponding initial HDs, together with a past modified HD (HD3').

Figure 4E:
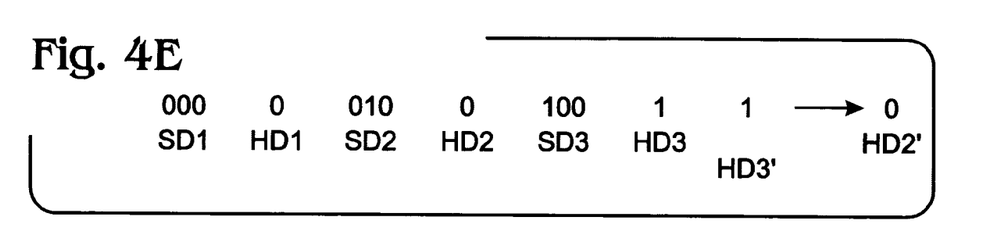

FIG. 4E depicts a sequence organized per the structure of FIG. 4D, where the SD and HD symbols have been replaced with actual bit values.

Figure 5:
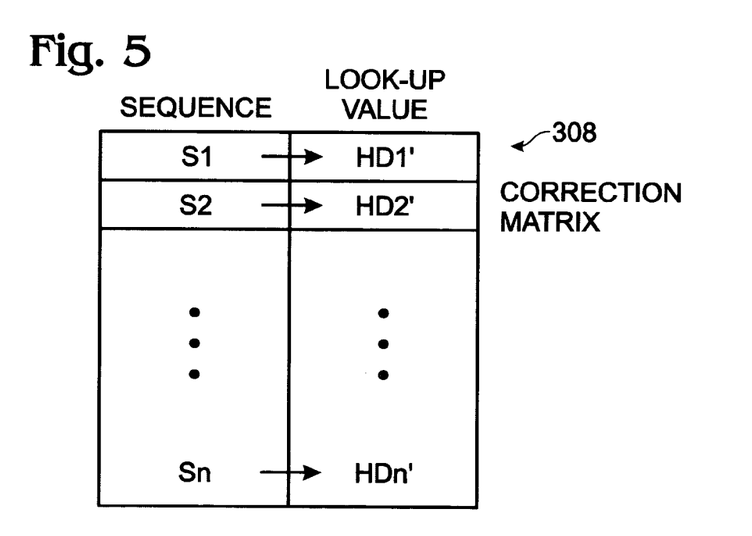
FIG. 5 is a drawing depicting the correction matrix of FIG. 3 in greater detail.

FIG. 5 is a drawing depicting the correction matrix of FIG. 3 in greater detail. As represented, each sequence acts as an address to locate a corresponding HD look-up value (modified HD or HD') in a memory matrix of look-up values.

Returning the FIG. 3, the decoder 312 generates a decoded HD decision that may also be referred to as a corrected initial HD or an uncorrected initial HD. As noted above, the terms "corrected" and "uncorrected" are defined with respect to the initial HD, and not with regard to changes made upon the modified HD as a result of the decoding process. The MLE 316 records the number of corrected (or uncorrected) HDs, as defined with respect to the initial HDs, and updates the HD look-up value in response to the number of corrected (or uncorrected) initial HDs.

For example, the MLE 316 may count the number of corrected initial HDs for every sequence of SDs, corresponding initial HDs and modified HDs, where the sequences are organized as shown in FIG. 4D. The MLE 316 also counts the number of uncorrected initial HDs for every sequence of SDs, corresponding initial HDs and modified HDs, and compares the number of corrected initial HDs to uncorrected initial HDs. The MLE updates 316 the correction matrix 312 with a HD look-up value that minimizes the number of corrected initial HDs.

Using the sequence of FIG. 4E as an example, the MLE uses this sequence to access a look-up value of "0". The MLE 316 counts the number of times that the use of this initial HD value is correct. Note, if the current initial HD value (HD2) is a "0" (as shown) and the look-up value accessed (HD2') is also a "0", the value "0" output of the IOM is still referred to as a "modified HD", even though the current HD value did not change. If the MLE 316 determines that the use of the modified value is leading to a large percentage of corrections, then the look-up value is likely to be replaced with new look-up value. The point is using the look-up HD values is to minimize the number of changes that must be performed by decoder 312, based upon the assumption that the decoding process is only able to correct a finite number of bits errors in a sequence of bits.

There are a number of algorithms that can be used to update look-up values. One simple method is to count the number of times the initial HD value is corrected. If the value is being corrected more than 50% of the time, the look-up value is replaced. Another algorithm may track just a more limited history of corrections (e.g., the last 1000 uses of the look-up value). The present invention is not limited to any particular algorithm.

One advantage associated with the use of the IOM and the look-up HD values is that modifications can be made in real-time, even though analysis rests upon the storage, tracking, and analysis of a history of data. If a future SD or HD is part of the sequence, as in the sequence of FIG. 4D, then there may be a slight time delay (e.g., one clock cycle) associated with the replacement of the initial HD with the modified HD.

Although the system has been described in the context of hardware modules, it should be understood that some, or all of the above-mentioned system elements may be enabled in software using a microprocessor and processor instructions (applications) stored in a memory.

Functional Description

Figure 6:
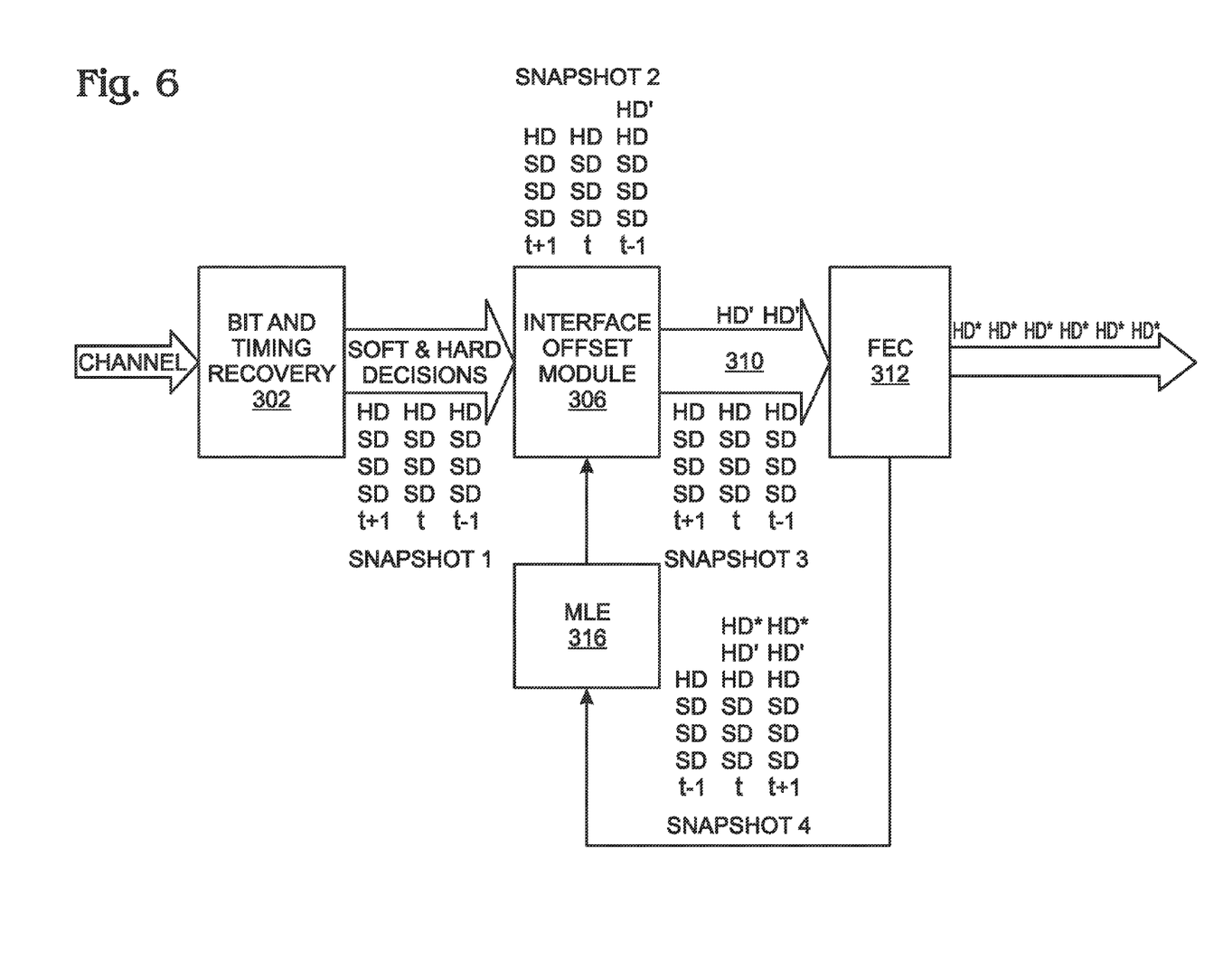
FIG. 6 is a schematic block diagram depicting the movement of a sequence through the system of FIG. 3.

FIG. 6 is a schematic block diagram depicting the movement of a sequence through the system of FIG. 3. A bit and timing recovery module (receiver) 302 provides a 3-bit soft decision (SD) and a 1-bit hard decision (HD) at times (t−1), t, and (t+1), see Snapshot 1. The IOM 306 adds the modified HD value from time (t−1), which is shown as HD', and identifies this particular sequence in the correction matrix, see Snapshot 2. The IOM 306 passes the sequence through on line 310, after adding the modified HD vale at time t, see Snapshot 3. Note, when time (t+1) becomes the current time, the IOM 306 adds the modified HD value for time (t+1). The decoder 312, depicted here as an FEC unit. The FEC 312 passes on the sequence of Snapshot 3 sequence, after adding a value representing the decoded HDs (HD*) for times (t−1) and t, see Snapshot 4. Note, the decoded HD may be the modified HD, if no change has been made as a result of decoding, or the modified HD with a sign change, if the modified HD value is changed, or a symbol representing that a change has been made (or has not) to the modified HD.

Figure 7A:
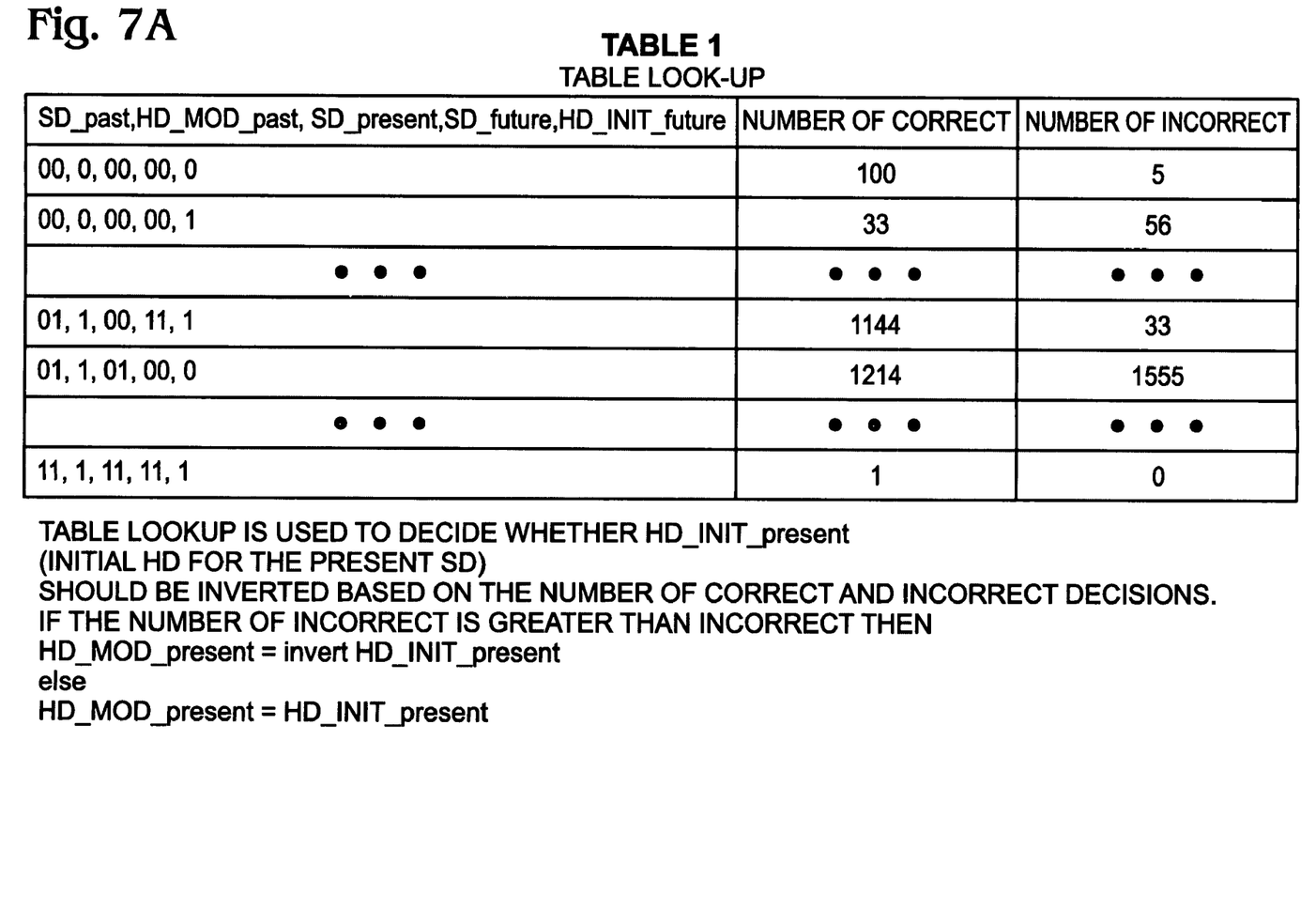
FIGS. 7A and 7B illustrate two Tables that may be used to enable the present invention MLE process.
Figure 7B:
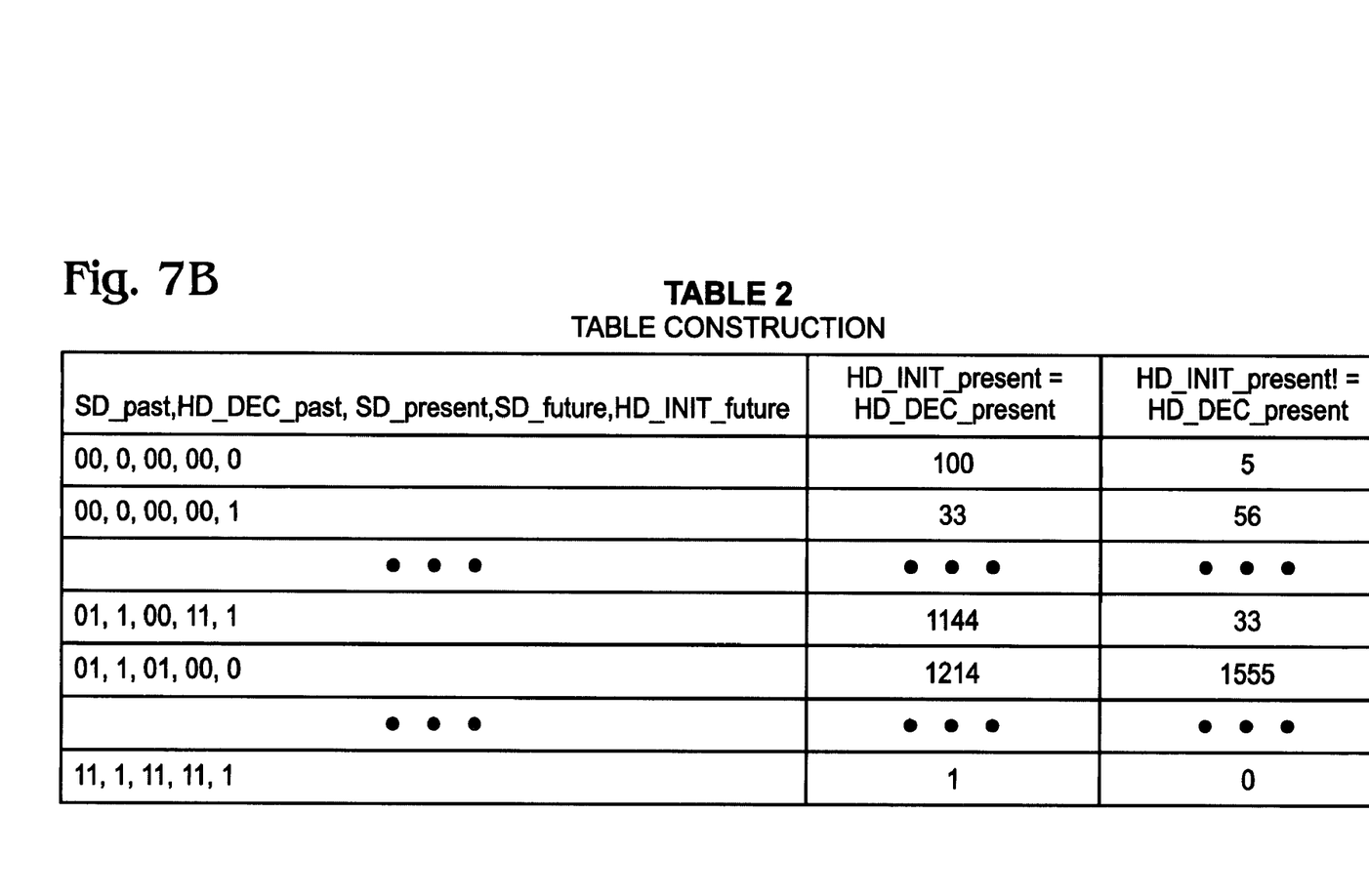

FIGS. 7A and 7B illustrate two Tables that may be used to enable the present invention MLE process. The data stream coming out of the decoder is assumed to be in the same temporal ordering is the data coming into the receiver, data is never reordered. Corrected pad HD (HD_DEC_past) refers to the time index that occurs prior to updating the corrected/uncorrected count for the current decision. Table 2 shows how the statistics are updated by comparing the decoded HD to the initial HD of the same time instance, to determine if initial HDs are more likely to be in error. If it is determined the initial HD is more likely to be in error, then the modified HD will be the inverted initial HD (ND INIT present!). Table entries in this example use a two-bit SD. Additionally the modified past HD and future initial HD are used in the entry of the lookup table (Table 1).

For real time processing, the future initial HD is always the initial HD value, since there is no preprocessing other than what is done in the receiver. The best estimate for "past modified HD" is the modified HD, since only FEC decoding can be more accurate.

The construction of the lookup table (Table 2) should mimic how this table is used (Table 1). The main difference is that the most accurate past HD is the decoded HD. As the system stabilizes, the modified HD converges to decoded HD value, as the number of changes made to the modified HD declines to a minimum.

Figure 8:
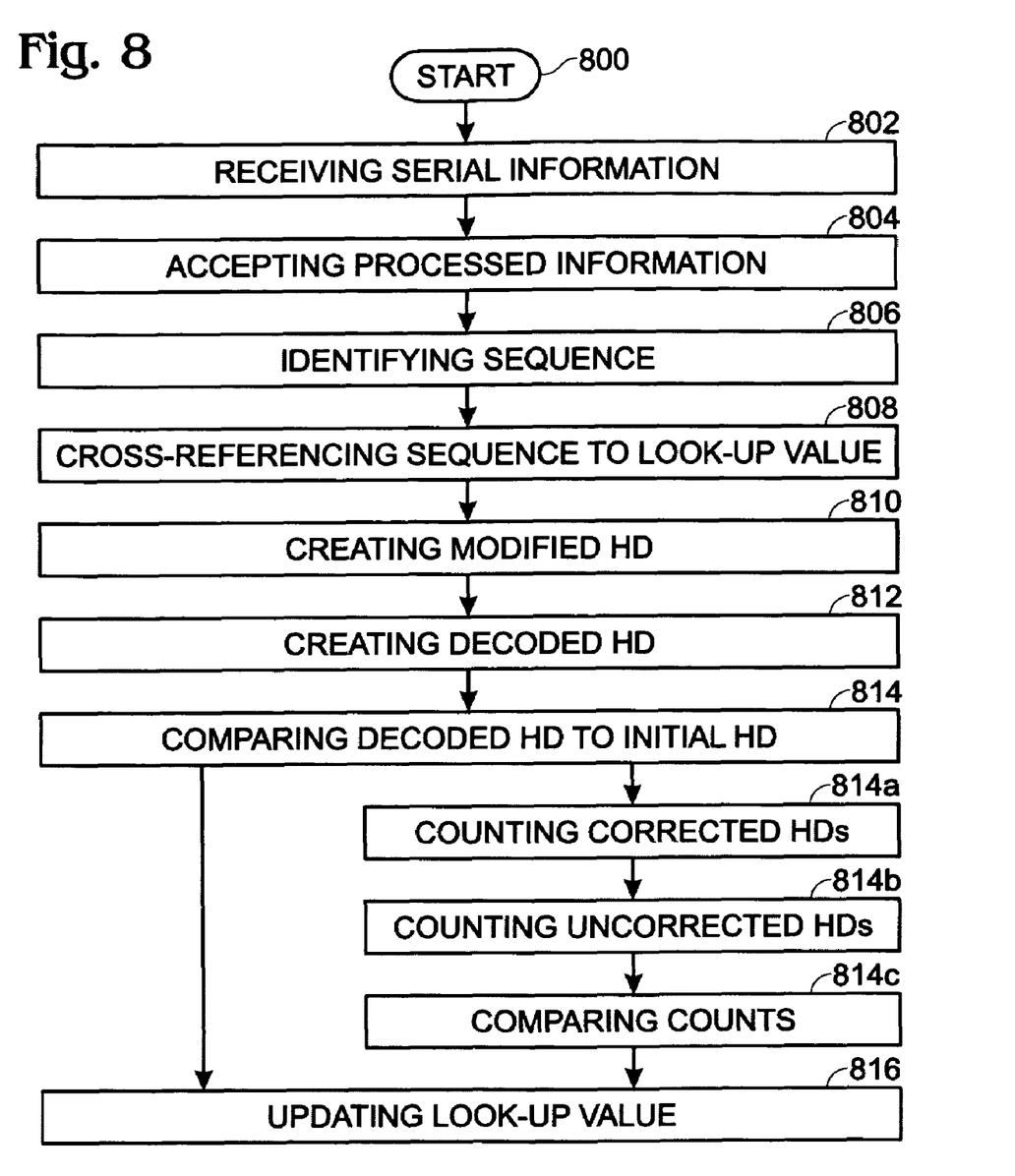
FIG. 8 is a flowchart illustrating a method for maximum likelihood estimation in a channel receiving data with ISI.

FIG. 8 is a flowchart illustrating a method for maximum likelihood estimation in a channel receiving data with ISI. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 800.

Step 802 receives a serial stream of digital information bits. Step 804 accepts processed information, with soft decisions (SDs) and corresponding initial hard decisions (HDs). Step 806 identifies a sequence of processed information in a correction matrix. Using the correction matrix, Step 808 cross-references the sequence to a HD look-up value. In response to accessing the HD look-up value, Step 810 creates a modified HD. Step 812 decodes the modified HD, creating a decoded HD. Step 814 compares the decoded HD to the initial HD. Step 816 updates the correction matrix HD look-up value in response to the comparison.

In one aspect, identifying the sequence of processed information in the correction matrix (Step 806) includes identifying a sequence of SDs and corresponding initial HDs in the correction matrix. For example, Step 804 may accept a temporal sequence including a current SD and initial HD, a past SD and initial HD, and a future SD and initial HD. Then, creating the modified HD, in response to the HD look-up value (Step 810), includes modifying the current initial HD.

In another aspect, identifying the sequence of processed information in the correction matrix in Step 806 includes identifying the sequence of SDs and corresponding initial HDs, together with a modified past HD.

In one aspect, comparing the decoded HD to the initial HD in Step 814 includes recording the number of corrected initial HDs, and updating the HD look-up value (Step 816) includes updating the HD look-up value in response to the number of corrected initial HDs.

More explicitly, comparing the decoded HD to the initial HD in Step 814 may include substeps. Step 814a counts the number of corrected HDs for every sequence of SDs, corresponding initial HDs and modified HDs. Step 814b counts the number of uncorrected initial HDs for every sequence of SDs, corresponding initial HDs and modified HDs. Then, Step 814c compares the number of corrected initial HDs to uncorrected initial HDs. Typically, updating the correction matrix HD look-up value in Step 816 includes updating the correction matrix with a HD look-up value that minimizes the number of corrected initial HDs.

In one aspect, accepting processed information with the SDs and corresponding initial HDs in Step 806 includes accepting a temporal sequence of SDs including a current real-time SD and current initial HD, a past SD and past initial HD, and a future SD and future initial HD. Then, decoding the modified HD in Step 812 includes creating a current real-time decoded HD. In another aspect, receiving the serial stream of digital information bits in Step 802 includes receiving a serial stream of bits with forward error correction (FEC). Then, decoding the modified HD in Step 812 includes FEC decoding the modified HD.

An MLE system and method have been provided for minimizing ISI in a receiver data channel. Some examples of particular sequences and correction algorithms have been provided to illustrate the invention. However, the invention is not limited to merely these examples. Other variations and embodiments of the invention will occur to those skilled in the art.

We claim:

1. A method for maximum likelihood estimation in a channel receiving data with inter-symbol interference (ISI), the method comprising:
   receiving a serial stream of digital information bits;
   accepting processed information, with soft decisions (SDs) and corresponding initial hard decisions (HDs);
   identifying a sequence of processed information in a correction matrix;
   using the correction matrix, cross-referencing the sequence to a HD look-up value;
   in response to accessing the HD look-up value, creating a modified HD;
   decoding the modified HD, creating a decoded HD;
   comparing the decoded HD to the initial HD; and,
   updating the correction matrix HD look-up value in response to the comparison.

2. The method of claim 1 wherein identifying the sequence of processed information in the correction matrix includes identifying a sequence of SDs and corresponding initial HDs in the correction matrix.

3. The method of claim 1 wherein accepting processed information with SDs and corresponding initial HDs includes accepting a temporal sequence including a current SD and current initial HD, a past SD and past initial HD, and a future SD and future initial HD; and,
   wherein creating the modified HD, in response to the HD look-up value, includes modifying the current initial HD.

4. The method of claim 3 wherein identifying the sequence of processed information in the correction matrix includes identifying the sequence of SDs and corresponding initial HDs, together with a modified past HD.

5. The method of claim 1 wherein comparing the decoded HD to the initial HD includes recording the number of corrected initial HDs; and,
   wherein updating the HD look-up value includes updating the HD look-up value in response to the number of corrected initial HDs.

6. The method of claim 5 wherein comparing the decoded HD to the initial HD includes:
   for every sequence of SDs, corresponding initial HDs and modified HDs, counting the number of corrected initial HDs;
   for every sequence of SDs, corresponding initial HDs and modified HDs, counting the number of uncorrected initial HDs; and,
   comparing the number of corrected initial HDs to uncorrected initial HDs.

7. The method of claim 6 wherein updating the correction matrix HD look-up value includes updating the correction matrix with a HD look-up value that minimizes the number of corrected initial HDs.

8. The method of claim 1 wherein accepting processed information with the SDs and corresponding initial HDs includes accepting a temporal sequence of SDs including a current real-time SD and current initial HD, a past SD and past initial HD, and a future SD and future initial HD; and,
   wherein decoding the modified HD includes creating a current real-time decoded HD.

9. The method of claim 1 wherein receiving the serial stream of digital information bits includes receiving a serial stream of bits with forward error correction (FEC); and,
   wherein decoding the modified HD includes FEC decoding the modified HD.

10. A system for maximum likelihood estimation in a channel receiving data with inter-symbol interference (ISI), the system comprising:
    a receiver having an interface accept a serial stream of digital information bits, and an interface to supply processed information with soft decisions (SDs) and corresponding initial hard decisions (HDs);
    an interference offset module having an interface for accepting the processed information, identifying a sequence of processed information in a correction matrix, cross-referencing the sequence to a HD look-up value, creating a modified HD in response to the HD look-up value, and supplying the modified HD at an output;
    a decoder having an interface connected to the interference offset module output, to decode the modified HD and supply a decoded HD at an interface; and,
    a maximum likelihood estimator (MLE) having an interface to accept the sequence of processed information, the modified HD, and the decoded HD, the MLE comparing the decoded HD to the initial HD, and supplying updates to the correction matrix HD look-up value in response to the comparison.

11. The system of claim 10 wherein the interference offset module cross-references the HD look-up value to a sequence of SDs and corresponding initial HD.

12. The system of claim 11 wherein the receiver supplies a temporal sequence including a current SD and current initial HD, a past SD and past initial HD, and a future SD and future initial HD; and,
    wherein the interference offset module modifies the current initial HD from the sequence, in response to the HD look-up value.

13. The system of claim 12 wherein the interference offset module cross-references the HD look-up value to a sequence of SDs and corresponding initial HDs, together with a past modified HD.

14. The system of claim 13 wherein the MLE records the number of corrected HDs, as defined, with respect to the initial HD, and updates the HD look-up value in response to the number of corrected initial HDs.

15. The system of claim 14 wherein the MLE counts the number of corrected initial HDs for every sequence of SDs, corresponding initial HDs and modified HDs, counts the number of uncorrected initial HDs for every sequence of SDs, corresponding initial HDs and modified HDs, and compares the number of corrected initial HDs to uncorrected initial HDs.

16. The system of claim 15 wherein the MLE updates the correction matrix with a HD look-up value that minimizes the number of corrected initial HDs.

17. The system of claim 10 wherein the receiver supplies a temporal sequence including a current real-time SD and current initial HD, a past SD and past initial HD, and a future SD and future initial HD; and,
    wherein the decoder creates a current real-time decoded HD.

18. The system of claim 10 wherein the receiver accepts a serial stream of digital information bits with forward error correction (FEC); and,
    wherein the decoder is an FEC decoder.

* * * * *